Dec. 21, 1926.

W. B. BRONANDER

INDEXING DEVICE

Filed Feb. 19, 1925

1,611,813

INVENTOR
Wilhelm B. Bronander
BY
Sydney Prescott
ATTORNEY

Patented Dec. 21, 1926.

1,611,813

UNITED STATES PATENT OFFICE.

WILHELM B. BRONANDER, OF MONTCLAIR, NEW JERSEY, ASSIGNOR TO AMERICAN MACHINE & FOUNDRY COMPANY, A CORPORATION OF NEW JERSEY.

INDEXING DEVICE.

Application filed February 19, 1925. Serial No. 10,158.

This invention relates to an improved indexing device and it has for its main object the production of an indexing device particularly adapted for use in installations where a quick throw and relatively long dwell of an index wheel is desired. Another object of the invention is the production of a device of this kind wherein the ratio of dwell to movement may be varied by changing the gearing operating the device. With this and other objects not specifically mentioned in view, the invention consists in certain constructions and combinations which will be hereinafter fully described and then specifically set forth in the claim hereunto appended.

Figure 1:
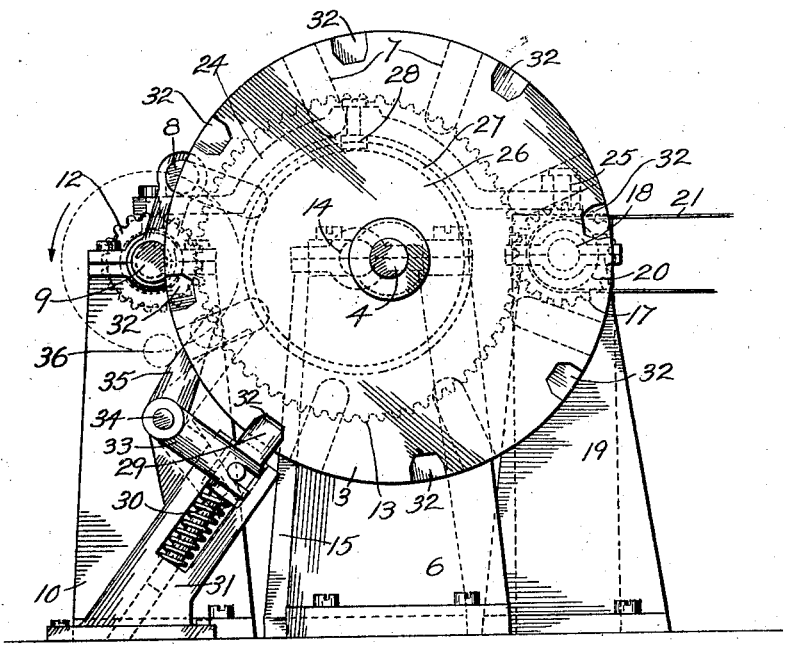
Figure 2:
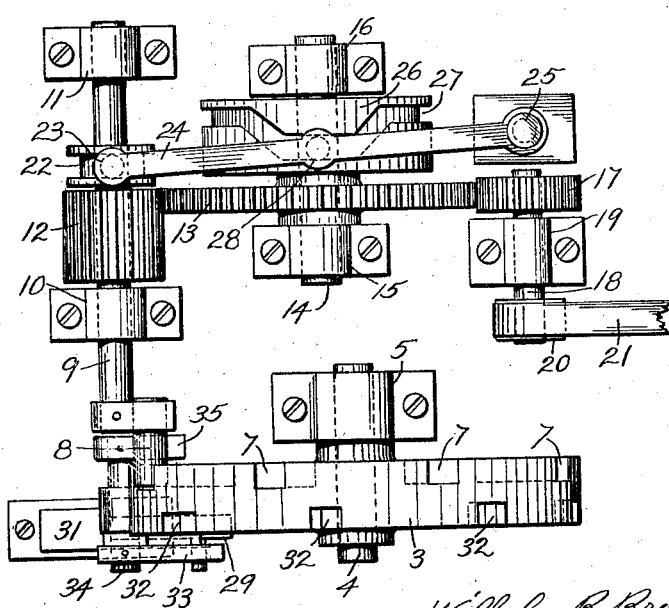

In the accompanying drawings, which form a part of this specification and in which like characters of reference indicate the same or like parts, Fig. 1 is front elevation of a device constructed in accordance with the invention; and Fig. 2 is a plan view of the device shown in Fig. 1.

In carrying the invention into effect, there is provided an index wheel, a revolving actuator therefor, and mechanism for incapacitating and rehabilitating the actuator in accordance with a predetermined ratio of actuator revolutions to wheel movements, which corresponds to the desired ratio of wheel dwell and wheel movement. In the best constructions contemplated, the actuator includes changeable gearing for controlling the ratio of its revolutions to wheel movements, and said mechanism is cam-actuated. The above mentioned mechanism and parts thereof may be widely varied in construction within the scope of the claim, for the particular device selected to illustrate the invention is but one of many possible concrete embodiments of the same. The invention therefore is not to be restricted to the precise details of the structure shown and described.

Referring to the drawings, 3 indicates an index wheel mounted on a shaft 4 one end of which is supported in a bearing 5 in the top of a pedestal 6. The wheel 3 is provided with a series of radial slots 7, cut in one of its faces and extending inwardly from its perimeter, these slots being adapted for engagement by a crankpin 8 which forms a part of a revolving actuator for producing the necessary step-by-step movements of the index wheel. This actuator also includes a shaft 9 which is rotatably and slidably mounted in bearings in the top of pedestals 10 and 11. Between the bearings on the pedestals, the shaft carries a wide-faced pinion 12 which is in mesh with a gear 13 fast on a shaft 14, the latter being journalled in bearings at the top of pedestals 15 and 16. The gear 13 is driven by a pinion 17 fast on a short shaft 18 journaled in a bearing in the top of a pedestal 19. This shaft also carries a pulley 20, driven by a belt 21, deriving its motion from any suitable source of power. By means of this gearing, the ratio of actuator revolutions to wheel movements is controlled, and this controls the ratio of wheel dwell to wheel movement. Gearing of different pitch diameters may be substituted for that shown in order to vary the ratio of actuator revolutions to wheel movements, which, as before stated, controls the ratio of wheel dwell to wheel movement; and this may be done without altering the relative position of the axes of the gears. Of course, the diameter of the pulley 20 may also be varied if desired.

Mechanism is provided for incapacitating and rehabilitating the cooperative relationship of the wheel and the actuator in accordance with the ratio of actuator revolutions to wheel movements, which is predetermined by the particular gearing used, the object of this mechanism being to secure a long dwell of the index wheel, without interrupting the uniform revolving movement of the actuator during a plurality of revolutions which is dependent upon the predetermined ratio. In the selected embodiment of the invention, this mechanism includes devices for longitudinally sliding the actuator in and out of cooperative relationship with the wheel. This is accomplished in the following manner.

Fast upon the shaft 9 is a grooved collar 22, and this collar is engaged by a stud 23 in one end of a cam lever 24 which is fulcrumed on a stud 25 at its other end. This cam lever is arched over a cam 26, fast on the shaft 14 before referred to, and provided with a cam groove 27 which is engaged by a cam stud 28 on the lever 24. By an inspection of Fig. 2, it will be noted that the pinion 12 is much smaller than the gear 13. The cam 26 and gear 13, being fast on the same shaft 14, will rotate at the same angular velocity, but the pinion 12 and shaft 9 will rotate at a higher velocity. In this figure, the parts are shown in the position they occupy when the crankpin 8 is just leaving one of the slots 7 of the index wheel. Just after this, the mechanism acts to incapacitate the cooperative relationship of the wheel and actuator by sliding the shaft 9 rearwardly until the crankpin 8 is free to revolve in the air. It is held in incapacitated position by the groove 27 of the cam 26 until the index wheel has had the desired dwell, and it is time to rehabilitate the cooperative relationship of the wheel and actuator. When this time comes, the shaft 9 is slid forward to the position shown in the drawings, where the proper cooperative relationship is again established, and during a part of one of its revolutions the crankpin 8 produces the required movement of the index wheel. Of course the contour of the cam groove in the cam 26 may be changed to vary the ratio of wheel dwell and wheel movement, as well as the gearing before referred to.

Means are provided for locking said wheel against accidental displacement when it is out of cooperative relationship with the actuator; or, in other words, when the crankpin is revolving in the air, without engaging the slot 7. In the selected embodiment of the invention, this locking means includes a spring-pressed latch 29, the spring being marked 30, and both being located in the bracket 31, with the latch slidable radially with respect to the index wheel 3. The latch engages one of a series of notches 32 cut in the face of the wheel 3 opposite the face in which the slots 7 are cut. For the purpose of withdrawing the latch 29 to unlock the wheel at the proper time, it has a pin and slot connection with an arm 33 fast on a short shaft 34 journalled in a bearing formed in the bracket 31. Fast on the other end of the shaft 34 is an arm or actuating member for said latch, which lies in the path of the actuator crankpin when the latter is moving into cooperative relationship with the wheel after a period of dwell. During this movement, the crankpin 8 comes into engagement with the arm 35, as shown by the dotted circle at 36, just before the crankpin reaches one of the slots 7. It therefore operates the arm 35 to unlock the index wheel 3, just before it engages one of the slots 7, and begins to move the wheel. After the crankpin has passed well into the slot engaged, it frees itself from the end of the arm 35, and the spring 30 then comes into action to hold the latch 29 against the perimeter of the wheel, ready to jump into the next notch 32 as the crankpin leaves the wheel slot after effecting wheel movement. In the illustrated embodiment of the invention, the wheel and the locking means operate in a fixed position, while the relative movement of the wheel and its actuator is effected by moving the actuator.

In view of the foregoing, a detailed description of the operation of the device is deemed to be unnecessary, and is therefore omitted in the interest of brevity and clearness.

What is claimed is:

The combination with an index wheel, of a revolving actuator therefor, and mechanism for incapacitating and rehabilitating the cooperative relationship of said wheel and said actuator in accordance with a predetermined ratio of the actuator revolutions to wheel movements, said wheel having notches, and means for locking said wheel including a spring-pressed latch for engaging said notches and an actuating member for said latch in the path of said actuator when moving into cooperative relationship with said wheel.

In testimony whereof, I have signed my name to this specification.

WILHELM B. BRONANDER.